Oct. 20, 1970  R. M. BAKKE  3,535,496

ADAPTIVE CONTROL SYSTEM

Filed Aug. 14, 1964  2 Sheets-Sheet 1

INVENTOR.
ROGER M. BAKKE
BY Elmer Galliat
ATTORNEY

Oct. 20, 1970   R. M. BAKKE   3,535,496
ADAPTIVE CONTROL SYSTEM
Filed Aug. 14, 1964   2 Sheets-Sheet 2

United States Patent Office 3,535,496
Patented Oct. 20, 1970

3,535,496
ADAPTIVE CONTROL SYSTEM
Roger M. Bakke, Los Gatos, Calif., assignor to International Business Machines Corporation, New York, N.Y., a corporation of New York
Filed Aug. 14, 1964, Ser. No. 389,679
Int. Cl. G05b 13/02
U.S. Cl. 235—150.1                                12 Claims

ABSTRACT OF THE DISCLOSURE

A method of adaptively controlling the gain of a closed loop system which includes measuring the energy transmitted in a plurality of selected frequency bands by the entire closed loop system to one of the state variables. One measurement is made in a first frequency band where the energy transmission capability of the system is strongly dependent on loop gain. This measurement obtains a first indication which is a function of both the system's loop gain state and the signal energy in the system at that particular time. A second measurement is made of the energy transmitted by the same state variable at other frequencies. Each of the frequencies chosen for the second measurement is both a frequency where the energy transmission capability of the system is independent, or weakly dependent, on loop gain and a frequency which is characteristic of a particular category of disturbance signals. The frequencies used for the second measurement include frequencies which are characteristic of each major class of disturbance whereby the second measurement obtains an indication which is indicative of the signal energy in the system in the first band of frequencies. The third step in the method consists of comparing the indications generated by the first two steps and appropriately adjusting the controller gain.

---

The present invention relates to closed loop control and more particularly to an adaptive method of closed loop control.

The type of response which a system under closed loop control exhibits is affected by the system gain. For example, with the gain set at a particular value, a system may overshoot, with the gains set at a different value the same system may react very slowly, and with the gain set at still a different value the same system may be unstable.

"Tuning a control system" refers to the operation of setting the various gains within the controller at values such that the system produces a desirable response. However, the response of the system is not solely dependent upon the gain settings in the controller. Certain nonlinearities within the plant which is being controlled and various disturbances can change the response of a system. Hence, although the gain in a controller are initially set so that the system produces the desired response, due to nonlinearities and external disturbances, the response of the system may not always be the particular response desired.

The art of adaptive control has been developed to correct the above noted deficiencies in conventional controllers. There are a number of textbooks on the art of adaptive control and an exceedingly large amount of technical literature. The proceedings of a symposium on adaptive control systems has been published by the MacMillan Company in 1961, entitled Adaptive Control Systems, edited by G. Felix Caruthers and Harold Levenstien (Library of Congress Card No. 62–11555). This book contains a large number of references to technical papers. A general survey of the state of the art is given in a paper by Stanley Shinners entitled "Optimal and Adaptive Control Systems" published in Electro-Technology, July 1964.

The adaptive control systems shown in the prior art generally fall into four categories. These categories are hereinafter referred to as the model type, the perturbation type, the limits cycle type and the frequency servo-type. The model type of system uses a simulated model of the process to develop a signal indicative of what the gain (or gains) of the controller should be. When the signal from the model differs from the signal from the actual controller, an appropriate adjustment is made. The perturbation type of system introduces a disturbance into the system and observes the response of the system due to this perturbation. The system gain (or gains) is then adjusted to obtain the appropriate response due to the perturbation. The limit cycle type of system develops high frequency oscillations (a limit cycle) in the closed loop system. The gain (or gains) of the system is adjusted to obtain the correct limit cycle response. The frequency servo-type of system detects the low frequency oscillations of the system output around the desired value. The gain of the system is then adjusted to obtain the desired frequency of oscillation.

The method of control which constitutes the present invention can be distinguished from each of the above systems because it does not employ a simulated model of the process, it does not introduce perturbation into the system, it does not have a limit cycle and if desired, the system can always operate in an overdamped state wherein the system's output does not necessarily oscillate after a disturbance or after a change in setting. The present invention is fundamental in nature and is not merely a slight adapation of the systems already known. The present invention provides a fundamentally new method of providing adaptive control.

An object of the present invention is to provide an improved methed of closed loop control.

Another object of the present invention is to provide an improved method of adaptive closed loop control.

A still further object of the present invention is to provide a method of adaptive closed loop control which is applicable to a large number of different control situations.

A still further object of the present invention is to provide a method of adaptive closed loop control which provides satisfactory results and which is economically feasible.

Yet another object of the present invention is to provide a method of adaptive control which does not introduce a perturbation or a limit cycle in the plant or system being controlled.

Yet another object of the present invention is to provide a method of adaptive control which does not require any measurements of the system or process other than those required for conventional closed loop feedback control.

Still another object of the present invention is to provide a method of adaptive closed loop control which does not require a model of the process.

A still further object of the present invention is to provide a method of adaptive control which can be applied to control a plant without first determining in detail the characteristics of the plant.

Yet another object of the present invention is to provide a method of control which is easily implemented by a general purpose digital computer.

The present invention is directed toward a method of adaptive closed loop control which utilizes the following facts: (1) The energy transmission capability of closed loop systems is generally a monotonically increasing function which is indicative of the system's loop gain state. (2) The disturbance signals (including intentional input signals and other disturbance signals) in any practical system fall into a plurality of categories. (3) Each category of disturbance signals has a relatively stable distribution of energy relative to frequency so that by measuring the magnitude of selected frequency components of the signal energy, one can determine the magnitude of the signal energy at other frequencies, and (4) the energy transmission capability of any system is strongly dependent on the system's loop gain state at certain frequencies and weakly dependent or non-dependent at other frequencies.

The method of the persent invention includes the steps of measuring the energy transmitted at a plurality of selected frequencies by the entire closed loop system to one of the state variables in the system (n.b. a state variable is a variable which is in the closed loop signal path). A first measurement is made in a frequency band where the energy transmission capability of the system is strongly dependent on loop gain. The first measurement obtains a first indication which is a function of both the system's loop gain state and the signal energy in the system at that particular time. A second measurement is made of the energy transmitted by the same state variable at other frequencies. Each of the frequencies chosen for the second measurement is both a frequency where the energy transmission capability of the system is independent or weakly dependent on loop gain and a frequency which is characteristic of a particular category of disturbance signal. The frequencies used for the second measurement include frequencies which are characteristic of each major class of disturbance; whereby, the second measurement obtains a second indication which is indicative of the signal energy in the system in said first band of frequencies. The first and second indications are compared to determine the present loop gain state of the system. The gain of the controller is then adjusted (adapted) in a direction so that the loop gain of the system is kept at the desired value.

The foregoing and other objects, features and advantages of the invention will be apparent from the following more particular description of preferred embodiments of the invention, as illustrated in the accompanying drawings.

SIG. 7 shows the frequency bands used in the first embodiment of the invention.

Figure 8:
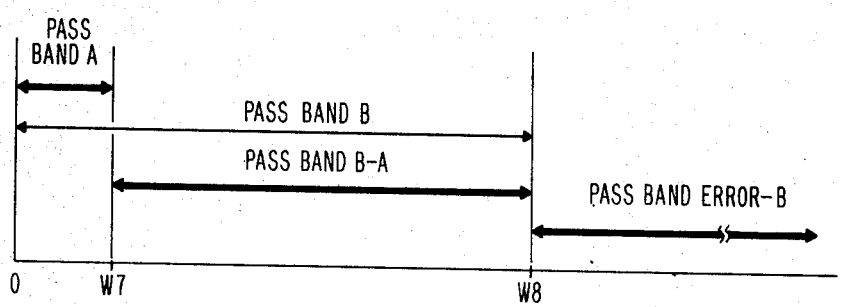

FIG. 8 shows the frequency bands used in the second embodiment of the invention.

Figure 1:
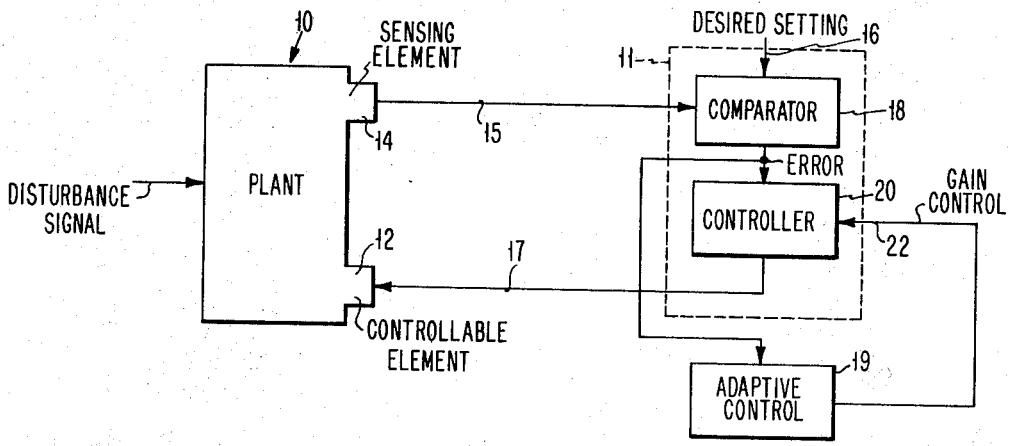
FIG. 1 is an overall view of a system wherein the present invention is applicable.

The environment wherein the present invention is applicable is shown in FIG. 1. This environment includes a plant or process 10 and an associated control system 11. The plant 10 has a controllable element 12 which is activated by a control signal 17 and an associated sensing element and transmitter 14 which generates an output signal 15. The control system 11 includes a set point 16 which can be set to indicate the desired level of output 15. The plant 10 may, for example, be a relatively simple hydraulic system which includes a series of pipes and tanks. In this case the controllable element 12 could be a valve regulating flow into the system and the sensing element could be a transducer and transmitter which generates a signal indicative of the level of fluid in a particular reservoir in the system. Likewise, the plant 10 may be a complex catalytic cracker or an entire airplane. In a catalytic cracker the controllable element could be a steam valve which controls temperature and the sensing element could be a measuring device which determines the percentage of some particular chemical at the output of the catalytic cracker. In an airplane the controllable element could be the hydraulic system which effects the movement of one of the elevons or other control surfaces and the sensing element 14 could be a rate gyro. Insofar as the present invention is concerned the exact nature of plant 10 is irrelevant. It is merely necessary that the plant 10 have a controllable element 12 and an associated sensing element 14.

A comparator 18 continuously compares the output signal 15 to the desired output level indicated by set point 16 and it generates an ERROR signal indicating any difference. Controller 20 responds to the ERROR signal and it activates the controllable element 12 in the direction required to eliminate the ERROR signal. The controller 20 has a gain control 22 for reasons which will be explained in detail later. Controller 20 may be a 1, 2, 3 or $n$ mode controller; that is, controller 20 may include proportional control and/or derivative control and/or integral control and/or higher orders of control. However, gain control 22 only affects the gain of the proportional part of the controller. The settings for the other gains on the controller are not shown herein since they are irrelevant to the specific embodiment of the invention shown. The value of the other gains is set in a conventional manner. A large variety of automatic controllers are commercially available. The commercially available controllers generally include comparator 18 and a controller 20.

Figure 2:
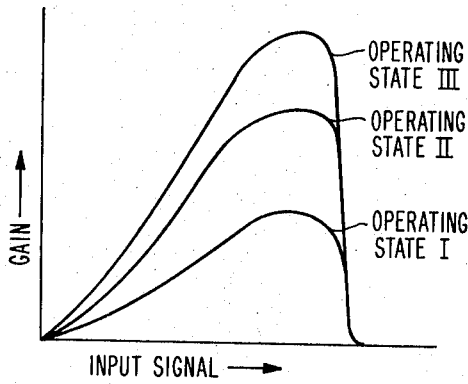
FIG. 2 shows the plant gain relative to input signals for various operating conditions of the plant.

Plant 10 includes nonlinearities and a plurality of possible operating states. The ratio between the magnitude of a change in the output signal 15 and the magnitude of a change in the input signal 17 is different for different levels of input signal 17 and for different operating states. The term "plant gain" represents the ratio between the magnitude of a change in output signal 15 due to a particular magnitude change in input signal 17. FIG. 2 illustrates the fact that the plant gain changes both when the magnitude or level of the input signal changes and when the operating state changes.

The following are examples of an operating state change and nonlinearities which change plant gain as shown in FIG. 2. In a hydraulic system which includes a tank having sections with different diameters, the plant gain changes when the level of fluid in the tank changes from a section of the tank having one diameter to a section of the tank having a different diameter. In an airplane, plant gain changes when the plane's altitude changes. The following are examples of nonlinearities which cause the plant to have different plant gains for different levels of input signals even though the plant is in the same operating state. In a hydraulic system wherein the sensing element 14 is a level transmitter and the controllable element 12 is a valve, if the response characteristic of valve 12 is nonlinear, the plant gain changes relative to the level of input of flow through the tank even though the operating state or level in the tank remains the same. In an airplane, if a nonlinear response in rate results from elevon input signals, the gain of the system changes with changes in input signal irrespective of the fact that the altitude (operating state) of the airplane does not change.

Controller 20 also has a proportional type of gain associated therewith. That is, for a particular rate of change in the ERROR signal, the rate of change in the output signal 17 generated by the controller 20 has a particular magnitude. This is herein termed the "controller gain." The total response of the overall system is dependent upon the system loop gain which constitutes the product of the controller gain times the plant gain. The theoretical basis for this is well understood and is explained in any of the standard books on automatic control. The term "system" will hereinafter be used to described the combination of all of the elements in the closed loop including plant 10, comparator 18 and controller 20.

Figure 3:
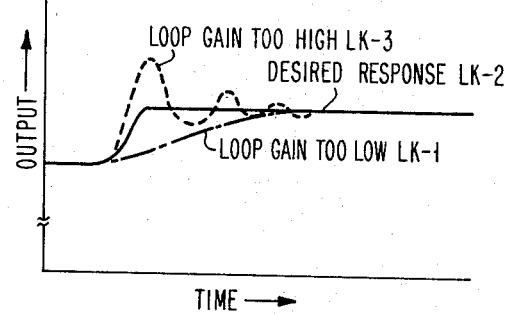
FIG. 3 shows the characteristic output of the system relative to time after a step input for various loop gains.

FIG. 3 shows three possible types of system response due to a step change in the desired setting 16. The particular type of response which the system exhibits is dependent upon system loop gain. If the system's loop gain is too high, the system overshoots and initially oscillates about the desired value. If the loop gain is too low, the system response is sluggish and requires a relatively long time to arrive at the desired value. The value of loop gain which is too high is designated LK-3, the desired value of loop gain is designated LK-2 and the low value of loop gain is designated LK-1.

Naturally, it is desirable that the system always have the desired response characteristics; that is, it is desirable to keep the loop gain at the value designated LK-2. However, as shown in FIG. 2, the plant gain varies as a function of the magnitude of the input signal and as a function of the operating state. Thus, in order to keep the system loop gain at the desired value, the gain of the controller 20 must be appropriately varied. The present invention is directed at a highly desirable method for varying the gain of controller 20.

Figure 4:
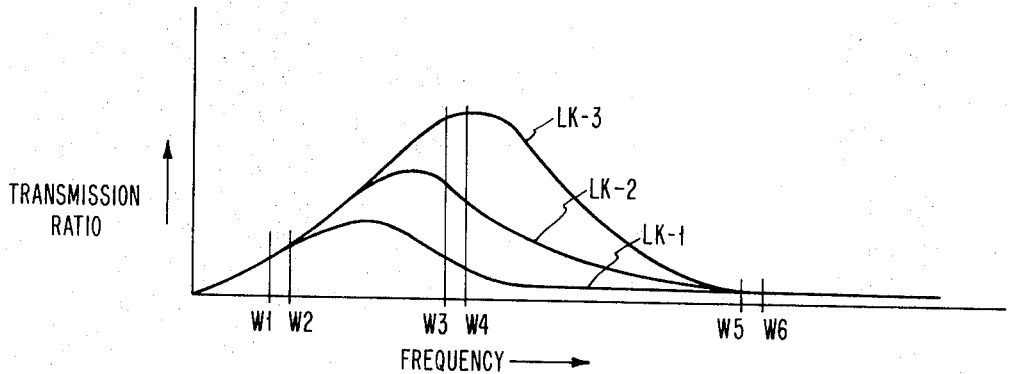
FIG. 4 shows the transmission ratio at various frequencies for various gain states.

Fundamental to an understanding of the method of the present invention is a recognition of the fact that the ratio of the magnitude of the ERROR signal to the magnitude of disturbance signal varies over the frequency spectrum. This is shown in FIG. 4. The ratio of the magnitude of the ERROR signal to the magnitude of the disturbance signal is hereinafter termed the transmission ratio.

The disturbance signals to which any physical plant (or process) 10 is subjected are of many different types. For example, they might be electrical noise signals or they might be mechanical vibrations. Furthermore, the disturbance signals which are injected into the system are injected at many various places in the closed loop. Changes in desired settings 16 are also herein termed disturbance signals. FIG. 4 merely illustrates the characteristics of the system to one arbitrarily chosen type of disturbance signal. However, for each possible type of disturbance signal the system has a frequency dependent transmission ratio such as the one shown in FIG. 4. The important fact is that at certain frequencies the magnitude of the transmission ratio is independent of or weakly dependent on the loop gain of the system; however, at other frequencies the magnitude of the transmission ratio is strongly dependent upon the magnitude of the loop gain. Stated differently, the variation in transmission ratio relative to frequency is different for different loop gains.

The energy in a particular frequency band which is transmitted by the system at any time can be expressed as:

$$E(t,k) = \int_{w1}^{w2} c(t,w) R(w,k)^2 dw$$

where:

$E(t, k)$ is the energy transmitted by the system as a function of time $(t)$ and the system gain state $(k)$,
$c(t, w)$ is the disturbance signal as a function of time and frequency $(w)$,
$R(w, k)$ is the transmission ratio as a function of frequency $(w)$ and loop gain $(k)$.

If the magnitude of the power of a certain frequency component of the ERROR signal is measured, the value obtained represents the product $[c(t, w_1)] [R(w_1, k_1)]$ where $w_1$ is the frequency at which the measurement is made and $k_1$ is the loop gain state of the system at time $t$. If the measurement is made at a frequency (or in a frequency band) where the transmission ratio is dependent upon the loop gain of the system, the value obtained is both a function of the disturbance signal and of the system's gain state. If, on the other hand, the measurement is made at a frequency where the transmission ratio is dependent of the system loop gain, the resulting value is only a function of the disturbance signal.

The disturbance signals which any system experiences can be divided into classes. Each class of disturbance will have a characteristic frequency spectrum. For each class of disturbance signals, if two or more particular frequencies are chosen, the magnitude of the components of the ERROR signals at these frequencies bear a particular relationship. Furthermore, for each class of disturbance signals, the two or more frequencies can generally be chosen so that one of these frequencies lies in the region where the transmission ratio of the system is strongly dependent on the system's loop gain and the other frequencies can be chosen in regions where the system transmission ratio is not dependent (or weakly dependent) on the system's loop gain.

With the present invention the power of a plurality of selected frequency components of the ERROR signal is measured. A measurement is made in a first frequency band where the transmission ratio is dependent on the systems loop gain and measurements are also made in bands where the transmission ratio is independent of gain. The measurements in the bands where the transmission ratio is independent of loop gain are used to reconstruct the magnitude of the components of the disturbance signal in the first band. This is possible because as previously explained for each class of disturbance the relative magnitude of various frequency components is relatively stable.

The measurement in the band where the transmission ratio is dependent on loop gain is used to give an indication of the system's present loop gain state. However, as previously indicated, the measurement in the band where the transmission ratio is dependent on loop gain is a function of both the disturbance signal and the system's loop gain. By comparing the reconstructed disturbance signal to the energy in the ERROR signal at frequencies where the transmission ratio is dependent on loop gain, the present value of the transmission ratio and, therefore, the present value of the loop gain can be ascertained, or, stated differently, the deviation of the system's loop gain from the desired value can be ascertained.

Figure 7:
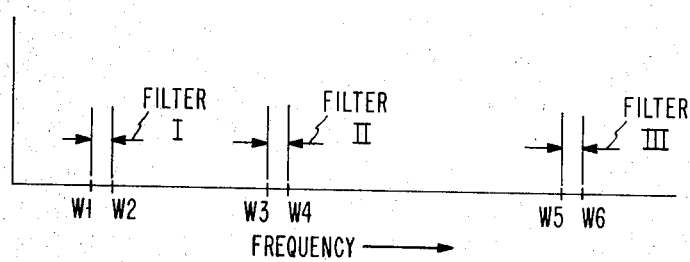

In order to reconstruct the magnitude of frequency components of the disturbance signal in the frequency band where the transmission ratio is gain dependent, the magnitude of the ERROR signal is measured in a separate band for each class of disturbance signals which has a different frequency spectrum. In the first specific embodiment shown, for ease of illustration, only two classes of disturbance are specifically considered. (If the system experiences other types of disturbances, the system will still operate; however, the gain adaptation will not be as comprehensive as if more classes of disturbance had been taken into account in the design of the system.) The first class of disturbance considered is a change in the set point 16. The frequency spectrum of the disturbance signal generated by a set point change has predominantly low frequency components; hence, a measurement of the magnitude of the ERROR signal between frequency W1 and W2 is made (see FIGS. 4 and 7). The frequency band between W1 and W2 is hereinafter designated the low frequency band. The second class of disturbance which is considered in the first embodiment of the invention is measuring instrument noise which has predoimnantly high frequency components. Hence, a measurement is made in the frequency band between frequencies W5 and W6 (see FIGS. 4 and 7). The frequency band between W5 and W6 is hereinafter designated the high frequency band. In the first embodiment shown, the gain dependent measurement is made in the frequency band W3 to W4 which is hereinafter designated the center frequency band.

For each class of disturbance, the relationship between the magnitude of the disturbance in the measured band and the magnitude of the disturbance in the center frequency band is stable since, as previously indicated, energy of each class of disturbance has a characteristic frequency spectrum. Thus, the measurement in the high and low frequency bands can be used to generate an indication of the energy which would be transmitted in the center frequency band if the system were operating at the desired gain state. If the energy actually measured in the center band is different from the amount of energy which would be transmitted if the system were operating at the desired gain state (as indicated by the measurement in the high and low bands), it indicates that the system's loop gain state is different from the desired value and that the controller's gain must be changed (adjusted) to bring the system's loop gain to the desired level.

Figure 5:
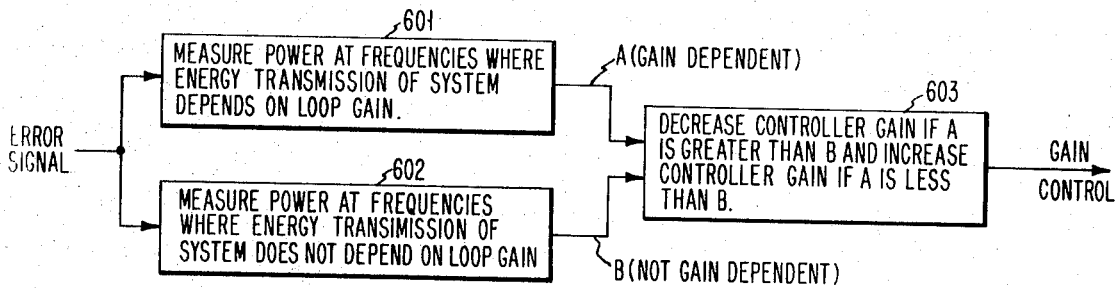
FIG. 5 is a flow chart which illustrates the method of the present invention.

The specific steps used to implement the method of the present invention are shown in FIG. 5. The three essential steps are indicated by boxes 601, 602 and 603. The step indicated by box 601 includes the measurement of the power in the ERROR signal at frequencies where the transmission ratio of the system depends on loop gain. For example, with reference to FIG. 4, block 601 represents a measurement of the power in the error signal between frequencies W3 and W4.

The step indicated by block 602 indicates the measurement of the power in the error signal at frequencies where the energy transmission ratio of the system does not depend on loop gain. For example, with reference to FIG. 4, this constitutes a measurement in the power of the error signal between frequencies W1 and W2 and between frequencies W5 and W6.

The step indicated by block 603 in FIG. 5 represents a comparison of the indications generated by the previous two steps. (For ease of reference, the results of the step indicated by box 601 is designated A and the results of the step indicated by box 602 is designated B.) If the results of step A is larger than the result of step B, the gain of the controller 20 in FIG. 1 is decreased; whereas, if the results of step A is smaller than the result of step B, the gain of controller 20 is increased.

Figure 6:
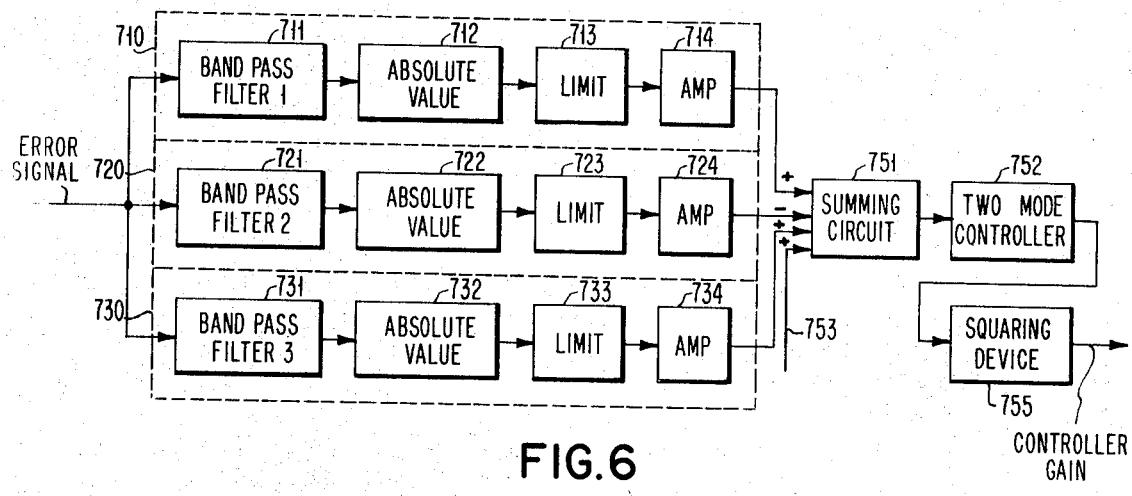
FIG. 6 shows hardware capable of executing the method of the present invention.

FIG. 6 represents hardware which is capable of performing the method of the present invention. The hardware shown in FIG. 6 includes three band pass filters 711, 721 and 731; three circuits designated 712, 722 and 732 for determining the absolute value of signals; three limiting circuits 713, 723 and 733; three variable gain amplifiers 714, 724 and 734; a summing circuit 751, a conventional two mode controller 752 and a squaring circuit 755. The circuits are arranged in three channel groups which are designated 710, 720 and 730. The group of circuits designated 720 is used to perform the step indicated by block 601 in FIG. 5 and the groups of circuits designated 710 and 730 are used to perform the step represented by block 602 in FIG. 5. Circuits 751, 752 and 755 are used to perform the step indicated by block 603 in FIG. 5.

The circuits designated 720 measure the power of the ERROR signal at frequencies where the energy transmission of the system depends on loop gain. Band pass filter 721 has a pass band between frequencies W3 and W4 (see FIG. 4 and 7) so that the output of filter 721 represent the magnitude of the components in the ERROR signal which lie between frequencies W3 and W4. In order to transform the output of filter 721 into an approximation of a power signal, its absolute value is taken by circuit 722. Taking the absolute value means that the output of circuit 722 is always positive and indicative of the value at the input of the circuit irrespective of the sign of the signal at the input of the circuit. The absolute value of a signal can be generated by well known circuits such as a bridge circuit. Limiter 723 is placed in the circuit 720 in order to prevent the system from responding to large totally spurious noise signals which occasionally occur. Variable gain amplifier 724 is connected in the circuit 720 in order to properly balance the outputs of circuits 710, 720 and 730. This will be explained in detail later.

The step indicated by block 602 in FIG. 5 is performed in two parts. Circuit 710 generates an indication of the power in the ERROR signal between frequencies W1 and W2 (see FIG. 4) and circuit 730 measures the power in the ERROR signal between frequencies W5 and W6. Circuits 710 and 730 have the same component circuits as circuit 720 which was previously explained; hence no detailed explanation of circuits 710 and 730 will be given.

Summing circuit 751 substracts the output of circuit 720 from the sum of (a) the output of circuit 710;
(b) the output of circuit 730; and
(c) a direct current reference signal supplied on input 753.

Reference signal 753 is provided to compensate for the portion of the disturbance signal not reflected in the outputs of circuits 710 and 730. Input 753 compensates for the classes of disturbance signal which have a component in the frequency range W3 to W4, but which is not adequately estimated by measurements in the frequency ranges W1 to W2 or W5 to W6. The magnitude of input 753 is set in the same way as is the gain of amplifiers 714, 724 and 734 (which will be explained).

Two mode controller 752 is a conventional two mode controller which accepts the signal from the output of summing circuit 751 and which mechanically or electrically controls the input of squaring device 755. The output of squaring device 755 mechanically or electrically adjusts the gain control 22 of controller 20. Squaring device 755 is provided so that with the same magnitude of input signal the rate of change of gain is greater for higher gain settings than for lower gain settings. Controllers, such as controller 752, and squares (multipliers) such as device 755, are commercially available. The output of squaring device 755 may be either mechanical or electrical, as required by the particular gain control 22 on controller 20.

The three variable gain amplifiers 714, 724 and 734 and input 753 are initially adjusted so that when the closed loop gain is at the desired value the output from amplifier 724 identically balances the sum of the outputs from amplifiers 714 and 734 and reference input 753. The gain of amplifiers 714, 724 and 734 and input 753 is adjusted to reflect the fact that for each class of disturbance signal there is a certain proportional relationship between the magnitude of the frequency components of that signal in each band.

The table which follows will be used to explain how the gain in amplifiers 714, 724 and 734 and the magnitude of input 753 reflect the shape of the frequency spectrum of the power in the various classes of disturbance signals. The table gives the magnitude of the frequency components of the two classes of disturbance signals which are considered in the embodiment which is shown. The table also gives the value of the system transmission ratio in the various frequency bands (a) when the system is operating at the desired gain state LK-2 (i.e., when the system is tuned) and (b) when the system is operating in a gain state LK-3 where the loop gain is higher than desired.

It should be clearly understood that the figures given in the following table are only exemplary. For any particular system the value of the various parameters, such as gain, could be determined analytically if sufficient information is known about the system and about the characteristics of the disturbance. However, a procedure for establishing the various parameters assuming that only a minimum amount of analytical information is available will be explained later.

The important point illustrated by the following table is that the gain of amplifiers 714, 724 and 734 and the magnitude of input 753 are adjusted so that when the system is operating at the tuned condition and disturbance signals are introduced into the system, the sum generated by circuit 751 is zero. The table also illustrates that if the system is at a loop gain state other than the desired value (i.e., if the system is untuned) the sum generated by circuit 751 has a value other than zero.

Lines 1 to 7 in the following table give values for the various parameters. The magnitude of the resulting outputs of circuits 710, 720 and 730 are given in the first three columns of lines 13, 16 and 19. It is noted that the magnitude of the output of each of the circuits 710, 720 and 730 can be considered to be the product of the magnitude of the associated frequency components of a disturbance signal times, the transmission ratio at the associated frequency, times the gain of the associated amplifier. This neglects various constants that do not affect the comparison which is made. The result of the comparison made by circuit 751 is given in the fourth column of lines 13, 16 and 19.

however, all of these functions were performed on a programmed general purpose process control computer. A programmed computer was connected so as to sequentially receive signals which indicate the magnitude of the ERROR signal. This information was transmitted to the computer through an analog to digital converter and thus, the computer merely periodically received digital signals indicating the value of the ERROR signal. The computer operated upon these digital signals to perform the function specified by the blocks in FIGS. 5 and 6. The computer then generated digital signals which provided an output

| | Frequency band | | | Sum generated by circuit 751 (magnitude of input 753 is 20) |
|---|---|---|---|---|
| | W1 to W2 | W3 to W4 | W5 to W6 | |
| Magnitude of first class of disturbance | 50 | 10 | 0 | |
| Magnitude of second class of disturbance | 5 | 10 | 30 | |
| Transmission ratio with desired gain LK2 | 2 | 14 | 1 | |
| Transmission ratio with high gain (LK3) | 2 | 20 | 1 | |
| Associated amplifier | 714 | 724 | 734 | |
| Gain of amplifiers | 2.6 | 2 | 7.98 | |
| Product of disturbance times transmission ratio times gain for first class of disturbance with gain LK2 | 2.60 | 280 | 0 | 0 |
| Product of disturbance times transmission ratio times gain for second class of disturbance with gain LK2 | 20.6 | 280 | 239.4 | 0 |
| Product of disturbance times transmission ratio times gain for first class of disturbance with gain LK3 | 260 | 400 | 0 | −120 |

The following describes how the various parameters in the adaptive control device 19 can be chosen. The important parameters which must be chosen are: first, the frequency bands for the filters 711, 721 and 731 and second, the gain of amplifiers 714, 724 and 734 and the magnitude of input 753. The other parameters such as the limits for circuits 713, 723 and 733 and the characteristics of controller 752 are not critical and these parameters which tend to optimize the performance of the adaptive control can, if desired, be chosen by trial and error.

The frequency bands of the filters and the gain of the amplifiers can be chosen by operating the main system (plant 10, comparator 18 and controller 20) without the adaptive control 19. The system must be tuned in a conventional manner and operated in a tuned gain state. While the system is operating in a tuned state, data on the magnitude of the signals in various frequency bands can be collected. From this data gain dependent and gain independent bands can be identified. Furthermore, by examining the value of the signals in the various frequency bands, the gains of the amplifiers 714, 724 and 734 and the magnitude of input 753 can be selected so that they satisfy the condition that the sum generated by circuit 751 is zero when the system is tuned. Insofar as the present invention is concerned, it is irrelevant as to how the controller 20 is initially tuned and it may be tuned by any of the methods presently employed. When the system is operating according to the method of the present invention, the output of circuits 710 and 730 is substantially independent of the gain state at which the plant is operating; whereas, the output of circuit 720 varies in response to the particular gain state wherein the system is operating. Thus, when the system changes to a different operating point and the loop gain of the system changes, the output of circuit 720 changes; however, the output of circuits 710 and 730 remain substantially constant. When the system changes to a different gain state, summing circuit 751 generates a signal which activates controller 752 thereby adjusting the controller gain of the controller 20 to bring the overall loop gain of the system back to the desired value.

The blocks shown in FIG. 6 have been thus far described as actual hardware for performing the particular function specified. In one actual embodiment of the invention which has been built and tested, the function specified by the various blocks in FIG. 6 were performed;

signal to adjust the gain of the controller 20. The gain adjustment 22 on controller 20 could either be designed to operate directly from digital signals or a digital to analog converter could be provided. The analog signal could be used to drive a mechanical gain adjustment. These steps which comprise the present invention can be programmed on commercially available control systems which have provision for analog input and analog output such as does the IBM 1710 Control System (IBM is a registered trademark).

In order to perform the various operations designated by the boxes in FIG. 6 and to thus perform the method specified in the block diagram in FIG. 5, a digital computer performs a large number of very simple operations, such as addition, subtraction, etc.; however, these operations are so ordered as to result in the performance of the steps indicated in FIG. 5. One of the ways to specify the particular sequence of operations which the computer performs during the execution of the method of the present invention is to provide a listing of "Fortran" statements. These statements can be converted into actual machine instructions in a well known manner generally termed compiling. Systems and programs for compiling Fortran statements are commercially available.

In the following description, no attempt is made to draw distinction between such terms as "generating a signal" and "generating data manifestation representative of a signal." The distinction between information which is manifested by an analog representative (for example, the magnitude of a voltage), and information manifested as a binary number which, in turn, is manifested by voltage is sometimes maintained by calling one a signal and the other an indication. Such a distinction is irrelevant to the present invention and no attempt is made to draw or maintain such esoteric semantic distinctions. In these specifications, the meaning of words and the concepts or physical entities they describe is made clear by the context wherein these words are used.

The Fortran statements given below are self explanatory; however, in order to aid those who read this specifiation and who are not already familiar with the Fortran language, a brief explanation of the functions specified by each statement will be given. A more complete understanding of the Fortran language can be gained by reference to any of the standard textbooks on this subject. A specific explanation of how the Fortran language is used with the IBM 1710 System is given in a publication entitled "IBM 1710 Fortran Executive System Reference Manual" IBM Form Number C26-5879-1. This manual can be obtained through any IBM Branch Office.

For simplicity, the pass bands of the filters in the example given below are slightly different than the pass bands of the filter shown in FIG. 6. The pass bands of the filters used in the example of the invention shown below are shown in FIG. 8. Effectively, two filters are used, the first having a pass band from zero frequency to frequency W7 and the second having a pass band from zero frequency to frequency W8. Three signals manifested as digital numbers are developed from the results of the filtering. The range of these signals is shown in FIG. 8. The first signal, which is somewhat similar to the output of filter 711, has a pass band of from zero frequency to frequency W7. The second signal, which is similar to the output of filter 721, is developed by subtracting the output of the first filter from the output of the second filter whereby a signal which has a band from frequency W7 to frequency W8 is created. The third signal, which is somewhat equivalent to the output of filter 731, is generated by subtracting the output of the second filter (having pass band B) from the entire signal whereby a signal having all frequencies above frequency W8 is created. Naturally, the extremely high frequency signal has no effect since these frequencies are filtered out by the circuitry in the analog to digital converter.

The following are the Fortran statements which can be compiled, by using a standard Fortran compiler, into a series of machine language instructions which can be executed by a general purpose process control computer such as the commercially available IBM 1710 System.

Statements 1 to 13 establish specific constants for such things as pass bands and gain. These constants must be established for each specific system as previously explained. They can be established either analytically or by using the previously explained techniques. The specific constants given in the following statements are merely exemplary.

the various constants indicate. The use of the various constants will become clearer as the explanation of the program develops below.

Statement 1014 is the statement which generates the data which the following statements operate upon. It is a statement which causes the computer to sample the ERROR signals shown in FIGS. 1 and 5. General purpose process control computers such as the IBM 1710 System include multiplexed inputs to the analog to digital converter. One of these inputs could be connected to the line which connects comparator 18 to controller 20 (FIG. 1). The particular input point so connected is herein identified as number 1076. The subroutine called into operation by this statement causes point 1076 to be addressed and the analog value therefrom to be converted to a digital value and stored in a location which is identified by the label ERROR.

Statements 1015 through 1020 have as their function filtering similar to the function of circuits 711, 721 and 731 shown in FIG. 6. It is known that a single stage filter which has a pass band from zero frequency to frequency W2 can be described by the following mathematical statement where $s$ is complex frequency $$\frac{W2}{s+W2}$$

Likewise, it is known that the effect of a filter having a pass band from zero frequency to frequency W2 can be approximated on a sample data basis by the following type of operation.

$$OUTPUT = C1 \times INPUT + C2 \times PREVIOUS\ OUTPUT$$

where C1 and C2 are constants which determine the pass band of the filter.

Furthermore, it is known that a three stage filter can be effected by three operations as that described above

| | | |
|---|---|---|
| 1001 | AL=+0.02 | |
| 1002 | AH=+0.90 | |
| 1003 | BL=+0.98 | Establishes the exact band of filtration. |
| 1004 | BH=+0.18 | |
| 1005 | GS=+0.1 | |
| 1006 | GN=+1.0 | Establishes the exact gain for amplification (similar to gain of amplifiers 714, 724 and 734). |
| 1007 | GO=+1.0 | |
| 1008 | ESL=+0.01 | |
| 1009 | ENL=+0.01 | Establishes the exact limits for limiting (similar to limits in circuits 713, 723 and 733). |
| 1010 | EOL=+0.04 | |
| 1011 | BIA=+0.005 | Establishes constant input to summation (similar to input 753). |
| 1012 | GPA=+5.0 | Establishes constants for proportional and integral control (similar to establishing characteristic of circuit 752). |
| 1013 | GIA=+10.0 | |
| 1014 | CALL RDADC (ERROR, 1076) | This statement calls in a standard subroutine which addresses the correct input to the ADC and thereafter stores the converted value at a location designated ERROR. The number 1076 is exemplary of the identification of the multiplexer input point which is connected to the output of the comparator 18. |
| 1015 | Y1=AL*ERROR+BL*Y1 | |
| 1016 | Y2=AL*Y1+BL*Y2 | Filter with pass band A. |
| 1017 | Y3=AL*Y2+BL*Y3 | |
| 1018 | Y4=AH*ERROR+BH+Y4 | |
| 1019 | Y5=AH*Y4+BH*Y5 | Filter with pass band B. |
| 1020 | Y6=AH*Y5+BH*Y6 | |
| 1021 | YO=Y6-Y3 | Generates signal in band B-A. |
| 1022 | YN=ERROR-Y6 | Generates signal in band ERROR-B. |
| 1023 | ESM=ABSF (Y3) | |
| 1024 | ENM=ABSF (YN) | Takes absolute value of signals in various bands (similar to circuits 712, 722 and 732). |
| 1025 | EOM=ABSF (YO) | |
| 3008 | IF ESL-(GS*ESM) 3009, 3009, 3011 | |
| 3009 | ESML=ESL | Limits and amplifies signal in band A (similar to circuits 713 and 714). |
| 3010 | GO TO 3012 | |
| 3011 | ESML=(GS*ESM) | |
| 3012 | IF ENL-(GN*ENM) 3013, 3013, 3014 | |
| 3013 | ENML=ENL | Limits and amplifies signals in band B-A (similar to circuits 723 and 724). |
| 3031 | GO TO 3015 | |
| 3014 | ENML=GN*ENM | |
| 3015 | IF EOL-(GO*EOM) 3016, 3016, 3018 | |
| 3016 | EOL=EOM | Limits and amplifies signals in band ERROR-B (similar to circuits 733 and 734). |
| 3017 | GO TO 3019 | |
| 3018 | EOML=GO*EOM | |
| 3019 | ERA=BIA+ESML-ENML+EOML | Generates appropriate sum (similar to circuit 751). |
| 3020 | SERAI=SERAI+GIA*ERA | Provides nonlinear proportional plus integral control (similar to circuits 752 and 755). |
| 3021 | GAIN=(ERA*GPA+SERAI)**2 | |
| 3022 | CALL ANAOT (1711 GAIN) | This statement calls for a subroutine which is identified as ANA OT which sends the computed value of gain to the appropriate output identified as 1711. |

Statements 1001 to 1013 establish constants for particular parameters such as the pass band of the various filters. An indication is given in the above table as to what wherein the output of the first operation is used as the input of the next operation. Thus, statements 1015 to 1017 effect the function of a filter having a pass band A (see FIG. 8) and statements 1018 to 1020 effect the function of a filter having a pass band B. The constants AL, BL, AH and BH establish the pass bands for the fiters.

Statements 1021 and 1022 effect subtractions. The subtraction effected by statement 1021 generates data related to the frequency components in the ERROR signal between W7 and W8. The subtraction effected by statement 1022 generates data related to all frequency components in the ERROR signal above frequency W8 and below the ADC cutoff frequency.

There are known subroutines for use in digital computers which take the absolute value of numbers. These subroutines are in the standard programming libraries. Statements 1023, 1024 and 1025 call for these subroutines in order to take the absolute value of the previously generated indications. This is similar to the functions performed by circuits 713, 723 and 733 in FIG. 6.

Statements 3008, 3009, 3010 and 3011 effect functions similar to the functions of circuits 713 and 714. Statement 3008 states that if the result of the arithmetic operation ESL−(GS×ESM) is less than zero, the next operation which should be performed is that operation designated 3009. If the result of the operation is equal to zero, the next operation which should be performed is also that designated 3009, and if the result of this operation is positive, the next operation which should be performed is that designated 3011. Statement 3009 is only executed when the absolute value is larger than, or equal to, the limit value. In this case, the number used for further calculation is the limit value (i.e., the constant designated ESL). Thereafter, the next statement performed is that designated 3012.

Statement 3011 is executed when the absolute value is not greater than the limit value ESL. In this case, the signal used for further calculation is the gain times the signal from the output of the filter.

Statements 3012 to 3014 and 3015 to 3018 are identical to the series of statements 3008 to 3011 except that these apply to the other two channels; hence, no detailed explanation of these statements will be given.

Statement 3019 generates the appropriate sum as does circuit 751. Statements 3020 and 3021 provide the same effect as does the two mode controller 752 and squarer 755. Statement 3020 provides integral control in that it states that the quantity SERAI should be replaced by the previous quantity SERAI plus a gain times the result of the summation. Statement 3020 directs that the final gain setting designated GAIN should be the square of the result of the gain GPA times result of the summation plus the result of the integral term. The reason that the square function is inserted was previously explained relative to circuit 755.

Statement 3022 causes the computer to call in a subroutine which sends the calculated gain adjustment to the appropriate output device. As with the previous embodiment the output device which receives the signal from the computer is connected to input 22 of controller 20 and it adjusts the gain of controller 20 by an amount indicated by the number (which is termed GAIN) which is calculated by the computer which comprises adaptive controller 19.

In the present specifications and in the appended claims, various terms are used in a functional sense and it is not relevant to the present invention as to what exact structure performed the functions specified by these terms. For example, the terms comparing, summing, etc., can be used to describe specific hardware which is capable of performing the functions specified. For example, there are a myriad of different types of electronic circuits which can compare two analog signals. Likewise, there are a myriad of circuits which can compare two digital signals. If the present invention is practiced in a digital environment, the comparison would most likely be performed on a digital basis; whereas, if the invention were practiced in an analog environment, the comparison would most likely be performed on an analog basis. However, by adding appropriate analog to digital and digital to analog converters, a digital comparator could be used in an analog environment and vice versa. The specific implementation for performing the functions specified by such terms is irrelevant to the present invention. The present invention is a combination of steps irrespective of how the various steps are performed.

The terms "signal" and "indication" are herein used to mean some manifestation of data which is capable of interpretation by either electronic equipment or by human perception, depending upon the equipment used to practice the present invention. The terms "passing a signal through a filter," "determining the magnitude of selected frequency components," "measuring selected frequency components," etc., are all used synonomously herein to describe the steps of extracting certain information from a signal and manipulating this information in a form capable of interpretation by electronic equipment or by human perception, depending upon the particular environment wherein the invention is practiced.

Naturally, it should be understood that the present invention is not limited to the relatively simple specific examples hereinbefore described. For example, in the specific embodiments hereinbefore described, the determination of the energy transmitted in various frequency bands is made by examining the system's ERROR signal. Other state variables (i.e., variables in the closed loop signal path) could have been used with equal success. In certain applications of the invention, peripheral consideration might make the use of other signals preferable to the use of the ERROR signal.

The amplifiers shown in the previous embodiment have each been limited linear amplifiers. For more complicated applications, various other types of nonlinear amplifiers might be desirable. The controller which controlled the gain is herein shown as a two mode controller with a squaring circuit on its output. Again, dependent upon the specific application, other types of nonlinear controllers with generalized dynamics would be useful.

The number of channels used to reconstruct the magnitude of the disturbance signal in the gain can be expanded, if needed. If the system experiences a large number of classes of disturbance, a large number of channels may be necessary to obtain a relatively accurate reconstruction of the disturbance signal. It should be further understood that if one class of disturbance signals has a frequency spectrum which is predominantly in an area where the system's transmission ratio is dependent upon gain, the parameters of the system can easily be adjusted in a well known manner such that the region where the system's transmission ratio is dependent upon gain could be shifted to another region.

The filters herein shown have been linear low pass and band pass filters. Naturally, it should be understood that different types of linear and nonlinear filters might be better suited to particular applications. Herein, the invention is shown as applied to adjusting the gain of the proportional control in controller 22. Naturally, it should be understood that the invention is applicable to the adjustment of various other modes of control in the main controller.

Many physical plants inlude a large number of control loops which are to some degree coupled. By assembling a matrix of information derived by the present invention applied to each loop, the gains in the various loops can be controlled in a more advantageous manner than by merely using the information obtained from the particular loop being controlled.

While the invention has been particularly shown and described with reference to preferred embodiments thereof, it will be understood by those skilled in the art that the foregoing and other changes in the form and details may be made therein without departing from the spirit and scope of the invention.

What is claimed is:

1. In a closed loop control system which includes a controller which responds to an error indication which indicates variations between the desired output and the actual output of said system, said controller having variable gain, the transmission ratio of said system being strongly dependent on loop gain at certain frequencies and weakly dependent on loop gain at other frequencies, said system having a desired response at one particular loop gain state, said loop gain state being in part determined by the gain of said controller;

the method of adaptively controlling said process comprising the physical steps of:

selecting first frequency components of said error indication, said first selected frequencies including a first band of frequencies where said transmission ratio is strongly dependent on the loop gain of said system;

selecting second frequency components of said error indication, said second selected frequencies including a second band of frequencies which are characteristic of particular types of disturbances and frequencies where said transmission ratio is weakly dependent on the loop gain of said system;

said first selected frequency components being exclusive of said second selected frequency components in at least one of said bands;

physically determining the magnitude of said first selected freqeuncy components of said error indication to generate an indication of the energy transmitted by said system at the particular time at said first selected frequencies, physically determining the magnitude of said second selected frequency components of said error indication to generate an indication of the energy transmitted by said system at the particular time at said second selected frequencies, physically comparing said indications of energy transmitted to determine the present loop gain state of the system, and adjusting the gain of said controller in a direction indicated by said comparison thereby maintaining said loop gain at said one particular loop gain state.

2. In a closed loop control system which includes a controller, said closed loop including a dynamic variable which receives closed loop signal energy including disturbance signals, said controller having variable gain, the transmission ratio of said system being strongly dependent on lop gain at certain frequencies and weakly dependent on loop gain at other frequencies, said system having a desired response at one particular loop gain state, said loop gain being in part determined by the gain of said controller:

the method of controlling said process comprising the physical steps of:

selecting first frequency components of said signal energy transmitted to said variable, said first selected frequencies including a first band of frequencies where said transmission ratio is strongly dependent on the loop gain of said system;

selecting second frequency components of said signal energy transmitted to said variable, said second selected frequencies including a second band of frequencies where said ratio is weakly dependent on the loop gain of said system;

said first selected frequency components being exclusive of said second selected frequency components in at least one of said bands;

physically determining the magnitude of said first selected frequency components of the energy transmitted to said variable at a particular time;

physically determining the magnitude of said second selected frequency components of the energy transmitted to said variable at said particular time;

physically comparing said indications to determine the present loop gain state of the system; and adjusting the gain in said controller in a direction indicated by said comparison thereby maintaining said loop gain at said one particular loop gain state.

3. In a closed loop control system which includes a controller, said controller having variable gain, the transmission ratio of said system being strongly dependent on loop gain at certain frequencies and weakly dependent on the loop gain at other frequencies, said system having a desired response at one particular loop gain state, said loop gain being in part determined by the gain of said controller, said system including at least one state variable;

the method of controlling said process comprising the physical steps of:

selecting first frequency components of signal energy transmitted by said system to said state variable, said first selected frequencies including a first band of frequencies where said transmission ratio is strongly dependent on the gain of said system;

selecting second frequency components of signal energy transmitted by said system to said state variable, said second selected frequencies including a second band of frequencies where said transmission ratio is weakly dependent on the gain of said system;

said first selected frequency components being exclusive of said second selected frequency components in at least one of said bands;

physically determining the magnitude of said first selected frequency components of the signal energy transmitted by said system to said state variable at the particular time;

physically determining the magnitude of said second selected frequency components of the signal energy transmitted by said system to said state variable at the particular time;

physically comparing said magnitudes to determine the present gain state of the system; and adjusting the gain in said controller in a direction indicated by said comparison thereby maintaining said loop gain at said one particular loop gain state.

4. The method recited in claim 1 wherein the step of determining the magnitude of first selected frequency components of said error indication is performed by passing said error signal through an electronic filter.

5. The method recited in claim 1 wherein the step of determining the magnitude of second selected frequency components of said error indication is performed by passing said error signal through an electronic filter.

6. The method recited in claim 1 wherein the step of determining the magnitude of first selected frequency components of said error indication is performed by converting successive sameples of said error signal to digital form and by manipulating the resulting data.

7. The method recited in claim 1 wherein the step of determining the magnitude of first selected frequency components of said error indication is performed by converting successive samples of said error signal from analog form to digital form and by thereafter performing the operation $Y = A \times \text{ERROR} + B \times Y'$ wherein Y indicates the magnitude of said selected frequency components, ERROR indicates the value of the present sample, A and B are constants and $Y'$ indicates the value of a previous sample.

8. The method recited in claim1 wherein the step of comparing said first and second indications is performed by a summing circuit which subtracts the magnitude of said first selected frequency components from the magnitude of said second selected frequency components and which adds a constant amounts to the result;

and wherein the step of adjusting the gain in said controller is performed by a secondary controller and a squaring device, said secondary controller receiving the output of said summing circuit as an input, said squaring device receiving the output of said secondary controller as an input, the output of said squaring device adjusting the gain of said main controller in response to the signal from said summer circuit.

9. The method recited in claim 1 including the step of limiting the value of said magnitude of said first selected frequency components to a first particular value and the step of limiting the value of said magnitude of said second selected frequency components to a second particular value before said magnitudes are compared.

10. The method recited in claim 1 which includes the steps of taking the absolute value of said magnitudes and selectively amplifying said magnitudes before said magnitudes are compared.

11. In a control system including a variable gain controller responsive to an error signal indicative of discrepancies between the desired output and the actual output, the transmission ratio of said system being strongly dependent on loop gain at certain frequencies and weakly dependent on loop gain at other frequencies, said system having a desired response at one particular loop gain, said loop gain being in part a function of the gain of said controller;

the method of adaptively controlling said process comprising the physical steps of:

selecting first frequency components of said error signal energy, said first selected frequency components including a first band of frequencies where said transmission ratio is strongly dependent on the gain of said system;

selecting second frequency components of said error signal energy, said second selected frequency components including a second band of frequencies where said ratio is weakly dependent on the gain of said system;

said first selected frequency components being exclusive of said second selected frequency components in at least one of said bands;

physically determining the magnitude of said first selected frequency components of said error signal to generate a first indication of the current signal energy;

physically determining the magnitude of said second selected frequency components of said error signal to generate a second indication of the signal energy at the particular time;

physically comparing said first and second indications to determine the present gain state of the system; and adjusting the gain in said controller in a direction indicated by said comparison so that said overall loop gain is maintained at said particular value.

12. In a closed loop control system which includes a controller which responds to an error indication which indicates variations between the desired output and the actual output of said system, said controller having variable gain, the transmission ratio of said system being strongly dependent on loop gain at certain frequencies and weakly dependent on loop again at other frequencies, said system having a desired response at one particular loop gain state, said loop gain state being in part determined by the gain of said controller;

an adaptive control system comprising:

first filter means for selecting first frequency components of said error indication, said first selected frequencies including a first band of frequencies where said transmission ratio is dependent on the loop gain of said system;

second filter means for selecting second frequency components of said error indication, said second selected frequencies including a second band of frequencies which are characteristic of particular types of disturbances and frequencies where said transmission ratio is independent of the loop gain of said system;

said first selected frequency components being exclusive of said second selected frequency components in at least one of said bands;

means responsive to said first filter means to generate an indication of the energy transmitted by said system at the particular time at said first selected frequencies;

means responsive to said second filter means to generate an indication of the energy transmitted by said system at the particular time at said second selected frequencies;

means for comparing said indications of energy transmitted to thereby generate a signal representing the present loop gain state of the system, and means responsive to said comparing means for adjusting the gain in said controller in a direction indicated by said comparison signal thereby maintaining said loop gain at said one particular loop gain state.

References Cited

UNITED STATES PATENTS

| | | | |
|---|---|---|---|
| 3,109,970 | 11/1963 | Smyth | 318—28 |
| 3,184,662 | 5/1965 | Wallace | 318—18 |
| 3,216,676 | 11/1965 | Brown et al. | 244—77 |
| 3,209,220 | 9/1965 | Joy | 318—18 |
| 3,221,230 | 11/1965 | Osburn | 318—28 |
| 3,250,903 | 5/1966 | Vasu et al. | 235—186 |
| 3,287,615 | 11/1966 | Smyth | 318—28 |
| 3,308,360 | 3/1967 | Vanderbilt | 318—18 |
| 3,334,282 | 9/1967 | Wolfe | 318—18 |

EUGENE G. BOTZ, Primary Examiner

PO-1050
(5/69)

UNITED STATES PATENT OFFICE
CERTIFICATE OF CORRECTION

Patent No. 3,535,496             Dated    October 20, 1970

Inventor(s) Roger M. Bakke

It is certified that error appears in the above-identified patent and that said Letters Patent are hereby corrected as shown below:

In Col. 5, the equation on line 49 should read:

$$--E(t, k) = \int_{w1}^{w2} c(t, w) \left| R(w, k) \right|^2 dw$$

At cols. 9 and 10, in the 8th line of the table, the figure 2.60 should read --260--; and in the 10th line of the table the figure 20.6 should read --26-- and the 0 should be changed to read --+5.4--.

SIGNED AND
SEALED
JAN 19 1971

(SEAL)
Attest:

Edward M. Fletcher, Jr.
Attesting Officer

WILLIAM E. SCHUYLER, JR.
Commissioner of Patents